Figure 1:
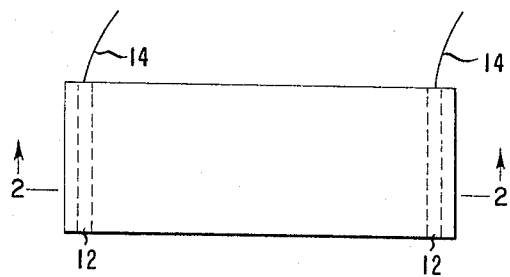

Oct. 4, 1966 C. H. BUTZ 3,277,419

LAMINATED HEATING UNIT

Filed Nov. 20, 1963

INVENTOR
CHARLES HENRY BUTZ

BY Albert C. Hodgson

AGENT 3,277,419
LAMINATED HEATING UNIT
Charles Henry Butz, Wilmington, Del., assignor to E. I. du Pont de Nemours and Company, Wilmington, Del., a corporation of Delaware
Filed Nov. 20, 1963, Ser. No. 325,049
3 Claims. (Cl. 338—314)

This invention relates to an electrically resistive, laminated structure, and, more particularly, to a laminated structure exhibiting anisotropic resistance heating characteristics and requiring no bonding agent to bond the joining layers.

It is an object of this invention to provide a laminated structure having at least one impervious layer which has electrical resistance heating capability. Other objects will be apparent to those skilled in the art from the following description and appended claims.

Heretofore electrical resistance heating devices generally consisted of a complex network of wires of a metal such as "Nichrome." Such devices have the inherent disadvantage of lack of temperature uniformity over the entire surface. Such devices have "hot spots," are not flexible and are easily subject to damage.

The laminates produced according to this invention are useful as heating elements in a wide variety of fields, such as warming trays and shelves, heating panels for homes and buildings, portable space heaters, cartridge heaters, dryers, hot-water heaters, stoves, and the like.

The electrically-resistive composition used as a center layer of the laminate consists of a highly filled, biaxially oriented polytetrafluoroethylene resin film having anisotropic properties. This composition is disclosed in copending application, Serial No. 94,129, filed March 8, 1961. This film is made by what is known in the art as the slip-forming process. The slip-forming process comprises making a hydrostatic, pressure-coalescible composition by mixing polytetrafluoroethylene fine powder with a liquid and sequentially working the composition to a pellicular structure by application of congruent compressive stress, directed normal to the surface of pellicule and shear stress, directed biaxially, predominantly parallel to the surface of the structure. During this working process, the thickness of the pellicule is reduced while maintaining the composition in a hydrostatic condition. Initially the hydrostatic state requires a liquid to resin ratio of 0.65 or more, but the working modifies the character of the resin particles, the liquid being expelled from the mass, and after substantial working, the hydrostatic condition can be maintained with a liquid to resin ratio as low as 0.4. Polytetrafluoroethylene fine powders consist of substantially spheroidal aggregates of ultimate, substantially spherical, particles of polytetrafluoroethylene, the aggregates having a diameter of 5 to 700 microns. The ultimate colloidal particles, of which the aggregates are composed, have a diameter between about 0.05 to 5 microns. Examination of slip-formed sheeting with the electron microscope shows the shape of ultimate colloidal particles essentially unchanged by the slip-forming process. The aggregates, however, are transformed to coherent lamella of an indefinite extent, but generally having a thickness less than 10 microns. Surprisingly, X-ray diffraction indicates that a substantial degree of biaxial, molecular orientation exists in the sheeting, which is retained upon drying the structures and heating them above the melting point of polytetrafluoroethylene. The X-ray ratios are determined by cutting a specimen from the roller film and mounting this in an X-ray diffraction apparatus. In determining the "A" ratio, the specimen is located with the plane of the film normal to the pin-hole collimated beam of X-rays. The transmitted beam is recorded on a flat plate film also mounted normal to the X-ray beam, i.e., parallel to the sample. The intensity of the 100 Debye-Sherrer ring, which occurs at a Bragg-plane spacing of 4.9 A. (25° C.) is measured as a function of position on the circumference of the Debye-Sherrer ring. At the position of maximum intensity, and also at the position of minimum intensity, a radial intensity scan is made across the Debye-Sherrer ring, traversing a sufficiently large distance on either side of the Bragg angle defining the ring to determine accurately the underlying background. The areas of the 100 crystalline peak above the diffuse intensity of the position of minimum intensity is compared to the area of the peaks at the position of maximum intensity to obtain a minimum to maximum ratio which is termed the "A" ratio.

The specimen is then sectioned in a direction perpendicular to a line drawn through the maxima of the 100 Debye-Sherrer ring, and the procedures outlined hereinabove are repeated to determine an X-ray ratio for the sample in a direction perpendicular to the plane of reaction and perpendicular to the direction employed for the "A" ratio. This ratio is referred to as the "B" ratio.

It has been determined in the copending application Serial No. 94,129, filed March 8, 1961, that the "A" X-ray ratio must be within the range of 1 to 0.4, and the "B" X-ray ratio must be within the range of 0.7 to 0.05 to obtain the beneficial result desired from the slip-forming process.

A further remarkable feature of this process is that extremely large amounts of fillers may be incorporated in slip-formed sheeting. Concentration of fillers up to 95% by volume may be incorporated without destroying the hydrostatic character of the compositon for interfering with the formation of slip-formed sheeting.

It has also been discovered that filled, slip-formed polytetrafluoroethylene sheeting possesses additional surprising properties. When filled with material having isotropic properties, slip-formed polytetrafluoroethylene sheeting exhibits properties of the filler in anisotropic form. These properties in combination with the benefits obtained from biaxial orientation of slip-formed polytetrafluoroethylene, result in a most useful product.

Generally speaking, about 95% by volume of the total solids in hydrostatic pressure-coalescible composition may consist of fillers. Preferably the volume of fillers should not exceed 90% of the total solids volume.

It has been discovered that by incorporating as a filler electrically-resistive material such as carbon black, graphite, powdered brass or powdered copper, a pellicular structure can be fabricated which exhibits electrically-resistive heating characteristics in anisotropic form. In addition, the heating properties are found to be substantially constant over the entire pellicular structure. It has been further found that the resistance value of such a pellicular structure remains substantially constant even when the temperature is varied by a variation in the current flow.

It has further been discovered that a commercial grade of silica may be employed as an additional filler in these pellicular structures. This serves to provide a more economical structure. While as much as 90 percent by volume of silica may be incorporated as a filler, it is preferred to employ from 40 to 60 percent by volume.

To fabricate a heating element utilizing the filled, slip-formed polyetetrafluoroethylene pellicule described above, the pellicule is placed on a structural backing member such as wall board; electrodes such as copper foil or the like are placed on the pellicule; and an insulatting film such as a film of FEP fluorocarbon resin is placed over the electrodes and the pellicule. This sandwich is then placed between pressing plates and pressed at about 100° C. and at least 350 p.s.i. pressure. The inherent tackiness of the pellicule causes the various parts to adhere under pressure thus eliminating any need for adhesive. This is a particularly important feature since adhesives tend to break down and exhibit other disadvantageous properties under prolonged exposure to heat.

A preferred embodiment of the laminated structure according to this invention is discussed hereinbelow and illustrated in the accompanying drawing, wherein—

Figure 2:
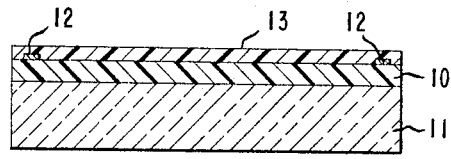

FIGURE 1 is a plan view of the laminated structure;
FIGURE 2 is a cross sectional view of the structure of FIGURE 1 taken substantially along the line 2—2 of FIGURE 1.

Referring to the drawing, an electrically resistive pellicule of particulate silica and carbon black filled biaxially-oriented polyteterafluoroethylene 10 is applied to a structural backing member 11 which may be wall board or the like. Electrodes 12 are placed on the electrically resistive pellicule 10. The pellicule 10 is then overlaid with an insulating film 13 of FEP fluorocarbon resin or the like. Wires 14 are connected to the electrodes 12. The wires 14 are connected to a variable source of electrical energy (not shown).

*Example 1*

Into a one gallon vessel having therein a bladed rotary cutter with the blades operating at a peripheral speed of about 2000 feet/minute was charged 1700 ml. of highly refined kerosene and 75.2 grams of particulate carbon black having an average particle size of 0.03 micron. This was allowed to mix for 15 seconds, and then 260 grams of silica having an average particle size of 7 microns was added and allowed to mix for an additional 30 seconds. 138 grams of polytetrafluoroethylene fine powder was then added and the mixture was cut for an additional 60 seconds. The mixture was immediately transferred to a suction filter and the kerosene lubricant was expelled until only 32 to 38 weight percent remained. A 230 mil thick filter cake thus formed was passed through 8 inch diameter calendering rolls at room temperature at a speed of 1.33 r.p.m. The opening between the rolls was 65 mils. The sheet thus formed was folded into three equal sections, turned 90° and passed through the rolls again (the space between the rolls was decreased by 8.5 mils). The resulting sheet was folded in half, turned 90° and again passed through the rolls (the space between the rolls was reduced by 10 mils). This procedure was repeated until a total of seven passes had been made, decreasing the spacing between the rolls after each pass, until a sheet 5 mils thick resulted. This sheet was then placed in a 200° C. circulating air oven for approximately 20 mins. All of the kerosene lubricant was removed from the sheet. The sheet was trimmed to the desired dimensions and placed onto ⅜ inch wallboard. Two 5 mil copper foil electrodes were placed on the sheet ½ inch from each end and extending about 1 inch past the width. A 2 mil insulating film of FEP fluorocarbon resin was laid over the sheet and electrodes, and the resulting sandwich was pressed for ten minutes at 100° C. and 350 p.s.i. pressure. The resistance of the sandwich was calculated using Ohm's law as the temperature was increased by the application of increased voltage. These results were compared with carbon under similar conditions. It was found that while the resistance of carbon decreases as the temperature increases, the resistance of the sandwich remained substantially constant as the temperature increased.

*Example 2*

A sheet was made by the procedure outlined Example 1. Volume resistivity was calculated across the length, width and thickness of a 5.8 mil cube taken from the sheet according to the formula:

$$\text{Volume resistivity (ohms-cm.)} = \frac{\text{resistance (ohms)} \times \text{area (cm.}^2)}{\text{length (cm.)}}$$

The volume resistivity for the sample was found to be 1.6 ohm-cm. across the length, 1.4 ohm-cm. across the width and 729 ohm-cm. across the thickness of the sheet. All measurements were made using a mercury cell and a Wheatstone bridge.

*Example 3*

The procedure of Example 1 was repeated using 40 volume percent silica, 20 volume percent carbon black, and 40 volume percent polytetrafluoroethylene fine powder. The sheet was rolled seven times to a final thickness of 6 mils. A 6 mil cube was taken from the sheet. The volume resistivity across the length was 0.83 ohm-cm., across the width was 0.90 ohm-cm., and across the thickness was 60 ohm-cm.

*Example 4*

A sandwich formed by the procedure of Example 1 was connected to a 120 volt source. Thermocouples were located at the four corners and at the center of the sandwich surface. The thermocouples were of the continuously recording type. Over a five-month period, the temperature as recorded by the individual thermocouples was found to be constant with no more then ±3° C. variation in temperature over the entire surface, maintaining a temperature of 92° C. at the center of the surface. The resistance of the sample was found to remain substantially constant over the five-month period.

It has been further discovered that the resistivity of these sandwiches may be varied from 5 to $>10^6$ ohms/sq. by varying the filler particle size, percent filler employed and number of passes employed. Using 300 A. carbon black and rolling the sheet seven times, a conductive sheet 5 mils thick can be obtained employing only four volume percent carbon black and having a resistivity of $3 \times 10^6$ ohms/sq. Apparently, at this level there is just enough carbon black present to cover all the polytetrafluoroethylene particles. As the amount of carbon black is increased, the conductivity greatly increases. If larger sizes of carbon black are employed the volume percent required to obtain a given resistivity will increase.

These sandwiches are highly stable at high temperatures. A panel has been maintained at over 278° C. for over two hours with no apparent adverse effect.

It can be seen from the volume resistivity figures given hereinabove that the conductivity characteristics of the sheet are anisotropic in nature and are higher in the plane parallel and perpendicular to the direction of the last pass of the sheet between the rolls than in the plane perpendicular to this plane.

It has been discovered that the possible tensile elongation of the sheets formed according to the procedure of Example 1 varies according to the duration of the cutting time of the mixture. The tensile elongation of the resultant sheet was found to rise to a maximum at about 60 seconds cutting time and to steadily decrease as the cutting time was increased. At the elapse of 60 seconds cutting time, carbon covered polytetrafluoroethylene particles, 100 to 200 microns in length, uniformly dispersed, are produced.

I claim:
1. A heating unit having an electrically resistive homogeneous layer of biaxially oriented polytetrafluoroethylene resin having from 5 to 95% by volume of electrically resistive particulate filler selected from the group consisting of carbon black, graphite, bronze and copper, and from 0 to 75% by volume of particulate silica filler, said layer having an "A" X-ray ratio of from 1 to 0.4 and a "B" X-ray ratio of from 0.7 to 0.05 and having electrodes connected thereto characterized in that said unit possesses uniform anisotropic resistive properties and produces uniform heating.

2. A laminated heating unit comprising a first layer of structural material, an intermediate electrically resistive homogeneous layer of biaxially oriented polytetrafluoroethylene resin having from 5 to 95% by volume of electrically resistive particulate filler selected from the group consisting of carbon black, graphite and bronze and from 0 to 75% by volume of particulate silica filler, said electrically resistive layer having an "A" X-ray ratio of from 1 to 0.4 and a "B" X-ray ratio of from 0.7 to 0.05, electrodes connected to said electrically resistive layer, said electrically resistive layer being characterized in that said layer possesses uniform anisotropic resistive properties and produces uniform heating over the surface thereof, and an electrically insulating layer, said layers being pressure laminated.

3. The heating unit of claim 2 in which said insulating layer is fluoroethylene propylene film.

References Cited by the Examiner

UNITED STATES PATENTS

| | | | |
|---|---|---|---|
| 2,473,183 | 6/1949 | Watson | 219—543 |
| 2,559,077 | 7/1951 | Johnson et al. | 219—543 |
| 2,635,994 | 4/1953 | Tierman | 338—309 X |
| 2,685,707 | 8/1954 | Llewellyn | 264—174 |
| 2,730,597 | 1/1956 | Podolsky et al. | 338—302 X |
| 2,761,945 | 10/1956 | Colbert | 219—543 X |
| 2,792,620 | 5/1957 | Kohring | 29—155.7 |
| 2,827,536 | 3/1958 | Moore et al. | 29—155.7 |
| 2,926,325 | 2/1960 | Moore et al. | 338—308 |
| 2,950,995 | 8/1960 | Place et al. | 338—308 X |
| 3,008,187 | 11/1961 | Slade | 264—119 |
| 3,044,901 | 7/1962 | Garnsworthy | 338—309 X |
| 3,052,573 | 9/1962 | Dumesnil | 338—308 X |
| 3,069,294 | 12/1962 | Davis | 338—308 X |
| 3,107,337 | 10/1963 | Kohring | 338—308 |

RICHARD M. WOOD, *Primary Examiner.*

ANTHONY BARTIS, *Examiner.*

V. Y. MAYEWSKY, *Assistant Examiner.*